United States Patent [19]

Niwa et al.

[11] Patent Number: 5,775,728
[45] Date of Patent: *Jul. 7, 1998

[54] PAD FOR STEERING WHEEL INCLUDING MEMBRANE SWITCH

[75] Inventors: Minoru Niwa; Kimio Muramatsu; Makoto Kanai; Michio Inoue; Junichi Mizutani; Takanori Kantoh; Tadashi Yamamoto, all of Nakashima-gun, Japan

[73] Assignee: Toyoda Gosei Co., Ltd., Nishikasugai-gun, Japan

[*] Notice: The term of this patent shall not extend beyond the expiration date of Pat. No. 5,577,766.

[21] Appl. No.: 700,989

[22] Filed: Aug. 21, 1996

Related U.S. Application Data

[62] Division of Ser. No. 216,824, Mar. 23, 1994, Pat. No. 5,577,766.

[30] Foreign Application Priority Data

Apr. 27, 1993 [JP] Japan ................... 5-101499

[51] Int. Cl.[6] ................................. B60R 21/16
[52] U.S. Cl. ................ 280/728.3; 200/61.55; 280/731
[58] Field of Search .................. 280/731, 728.3, 280/728.1; 200/61.54, 61.55

[56] References Cited

U.S. PATENT DOCUMENTS

| | | | |
|---|---|---|---|
| 5,085,462 | 2/1992 | Gualtier | 280/731 |
| 5,186,490 | 2/1993 | Adams et al. | 280/731 |
| 5,280,946 | 1/1994 | Adams et al. | |
| 5,306,040 | 4/1994 | Leonelli et al. | |
| 5,308,106 | 5/1994 | Heidorn | 280/728.3 |
| 5,369,232 | 11/1994 | Leonelli | |
| 5,382,046 | 1/1995 | Cuevas | |
| 5,501,485 | 3/1996 | Eckhout | |

*Primary Examiner*—Eric D. Culbreth
*Attorney, Agent, or Firm*—Cushman Darby and Cushman, IP Group of Pillsbury Madison & Sutro

[57] ABSTRACT

A pad for a steering wheel includes a membrane switch forming member and a cover member. The switch forming member includes a switch body and a support plate. The switch body has a plurality of conductive thin metal sheets and an insulating space interposed between the metal sheets. The support plate is made of rigid synthetic resin for supporting the switch body on its upper face and is formed in its outer peripheral edge with a plurality of mounting holes extending vertically. The cover member covers the air bag of an air bag device and is formed with a rupture portion adapted to be ruptured when the air bag is inflated, and mounting ribs projecting from the back face thereof and engaged with the mounting holes of the support plate. At least one of the outer peripheral edge of the support plate and the back face of the cover member is formed with gap regulating projections for setting a predetermined gap between the upper face of the support plate back face of the cover member.

5 Claims, 6 Drawing Sheets

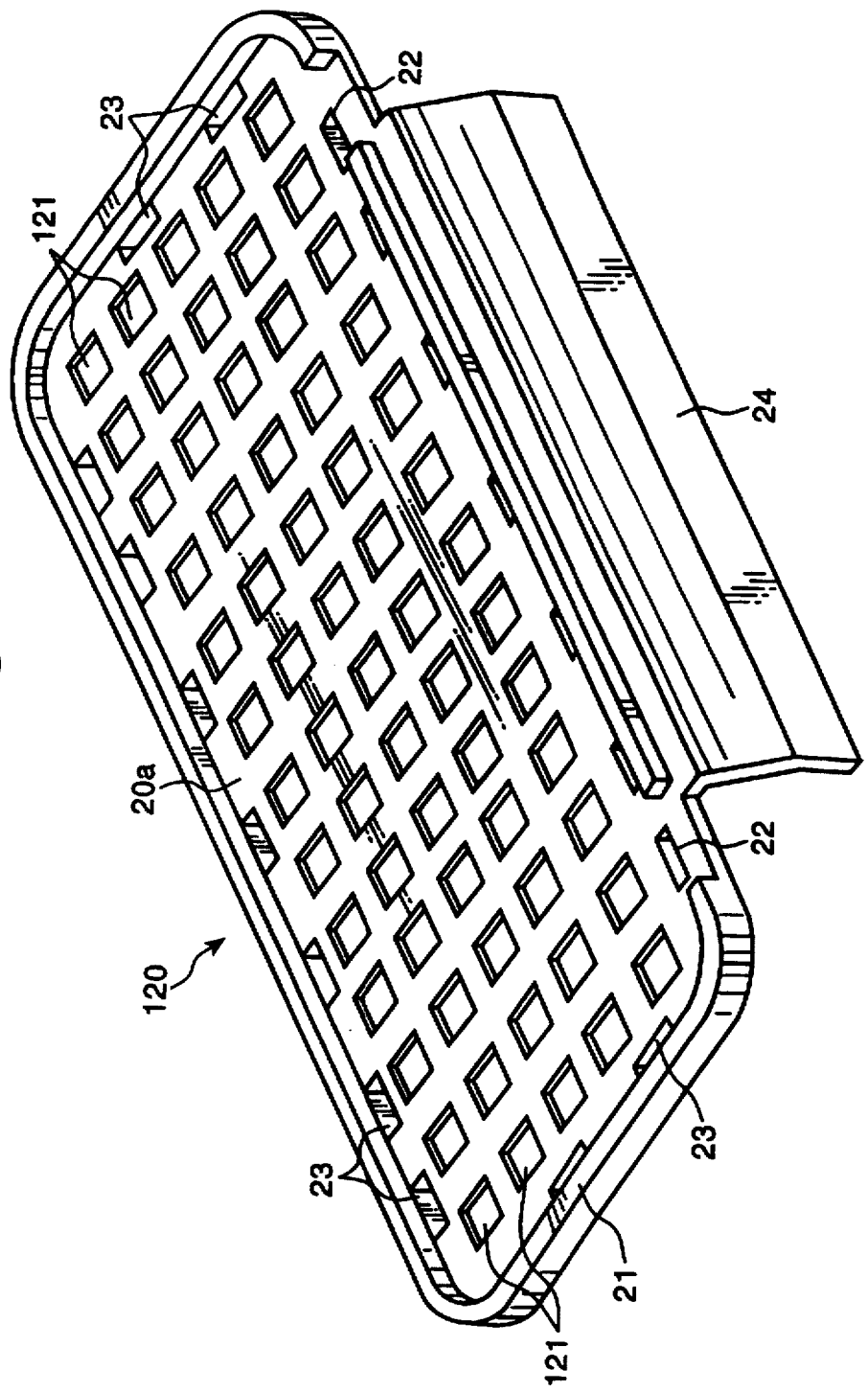

PAD FOR STEERING WHEEL INCLUDING MEMBRANE SWITCH

This is a division of application Ser. No. 08/216,824, field Mar. 23, 1994 now U.S. Pat. No. 5,577,766.

The priority application, Japanese Pat. Application No. Hei. 5-101499, filed in Japan on Apr. 23, 1993, is hereby incorporated herein by this reference.

BACKGROUND OF THE INVENTION (1) Field of the Invention

The present invention relates to a pad for a steering wheel for a vehicle equipped with an air bag device and, more particularly, to a pad comprising a membrane switch forming member and a cover member for covering the air bag.

(2) Description of Related Art

A pad for a steering wheel including a membrane switch forming member and a cover member for covering the air bag, is disclosed in U.S. Pat. No. 5,062,661.

In this pad, the membrane switch forming member is arranged on a back face of a diaphragm of the cover member. The membrane switch forming member is composed of a conductive thin metal sheet and a rigid conductive thick metal sheet. An insulating foamed member is interposed between the two sheets.

When the switch forming member is actuated, the diaphragm of the cover member is pushed. Then, the foamed member is compressed so that the thin metal sheet is deformed to contact with the thick metal sheet, energizing the horn.

The reason why the switch forming member has to be made of rigid material will be described below. Specifically, the pad covers the folded air bag of the air bag device. As a result, the folded air bag biases the pad. Thus, without the rigid member, the switch might be always turned ON by the intense bias of the air bag.

However, the switch forming member of the U.S. Pat. No. 5,062,661 is heavy because it is arranged with the thick metal sheet. As a result, the cover member has its opening speed lowered by the weight of the switch forming member, when it is opened as the air bag is inflated.

SUMMARY OF THE INVENTION

An object of the present invention is to provide a pad for a steering wheel which reduces the weight of the switch forming member to prevent the speed at which the cover member is opened as the air bag is inflated from decreasing.

The above-specified object is achieved by a pad for a steering wheel which has the following construction having a membrane switch forming member and a cover member.

Specifically, the switch forming member is constructed to include a switch body and a support plate. The switch body is composed of a plurality of conductive thin metal sheets and an insulating spacer interposed between the metal sheets. The support plate is made of a rigid synthetic resin and arranged for supporting the upper face of the switch body. This support plate is formed in its outer peripheral edge with a plurality of mounting holes extending vertically.

The cover member is provided for covering the air bag of the air bag device and is equipped with a thin rupture portion to be ruptured upon inflation of the air bag, and mounting ribs formed on the back face thereof for retaining the peripheral edges of the mounting holes of the support plate.

Moreover, at least one of the outer peripheral edges of the support plate and the back face of the cover member, at a position corresponding to the outer peripheral edge of the support plate, is formed with gap regulating projections for setting the gap between the upper face of the support plate inside of the outer peripheral edge and the back face of the cover member to a predetermined value.

In the pad according to the present invention, the predetermined gap is established by the gap regulating projections between the back face of the cover member and the upper face of the rigid support plate inside of the outer peripheral edge. As a result, the switch body arranged on the support plate can exhibit a predetermined operation stroke without being subjected to the bias of the folded air bag.

Moreover, the support plate is made of a synthetic resin so that the switch forming member can be made lighter than that of the prior art, which uses a thick metal sheet. As a result, the speed at which the cover member is opened is not reduced after inflation of the air bag.

Incidentally, the weight of the switch forming member can be further reduced if the support plate is formed with thin portions.

BRIEF DESCRIPTION OF THE DRAWINGS

FIG. 7 is a perspective view showing an example of another support plate.

DESCRIPTION OF THE PREFERRED EMBODIMENT

Figure 1:
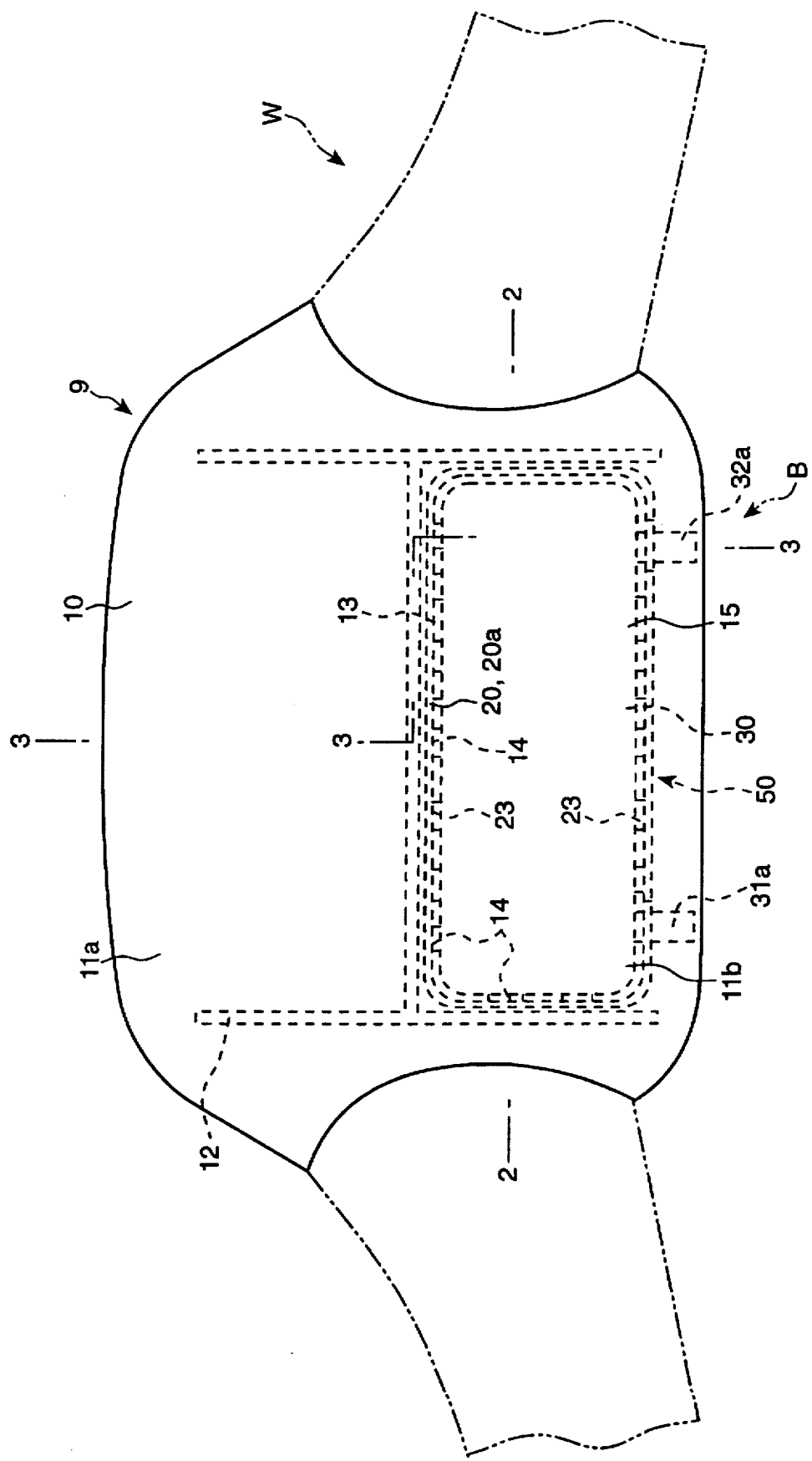
FIG. 1 is a top plan view showing a pad according to one embodiment of the present invention.
Figure 2:
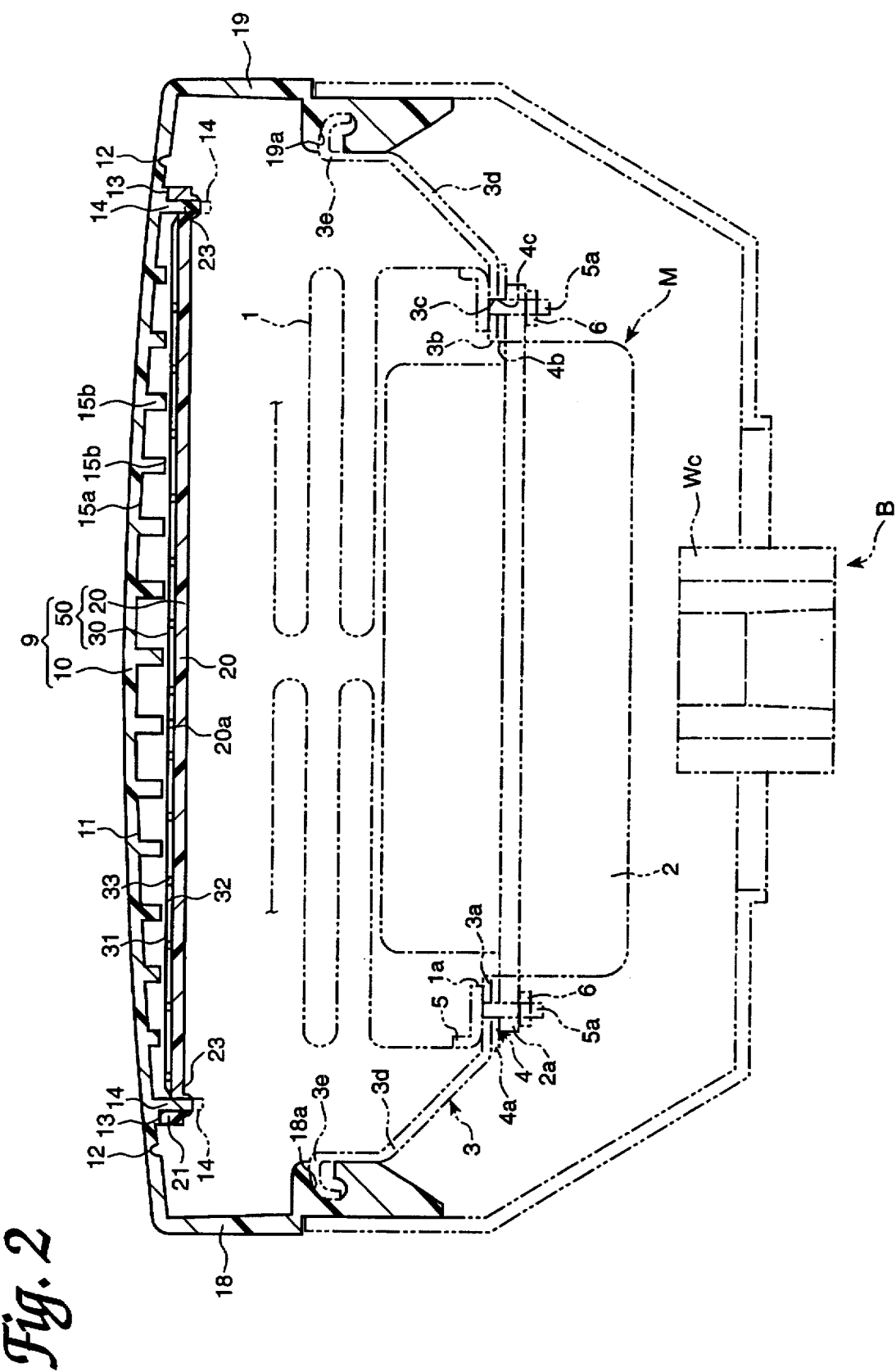
FIG. 2 is a sectional view taken along line 2—2 of FIG. 1.
Figure 3:
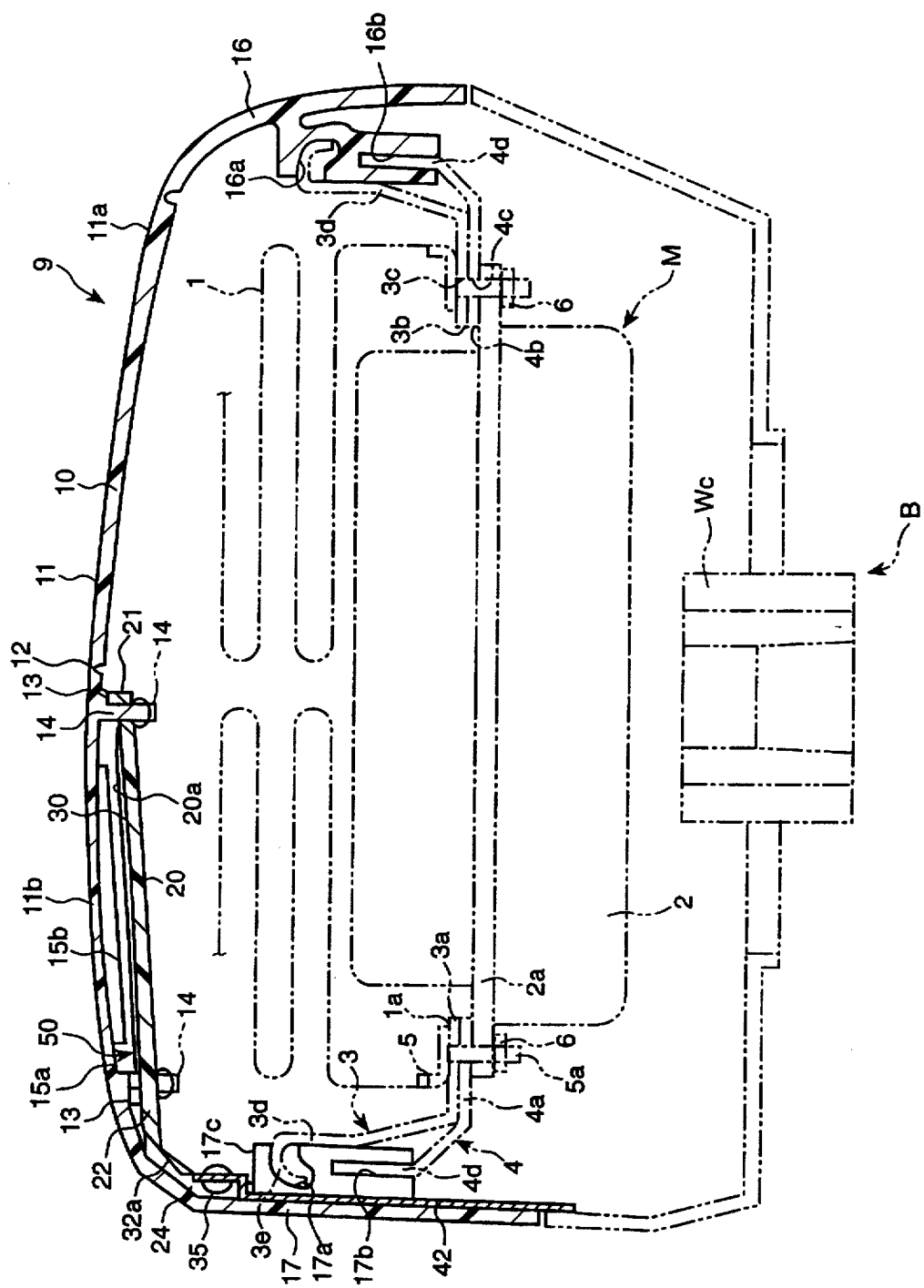
FIG. 3 is a sectional view taken along line 3—3 of FIG. 1.
Figure 4:
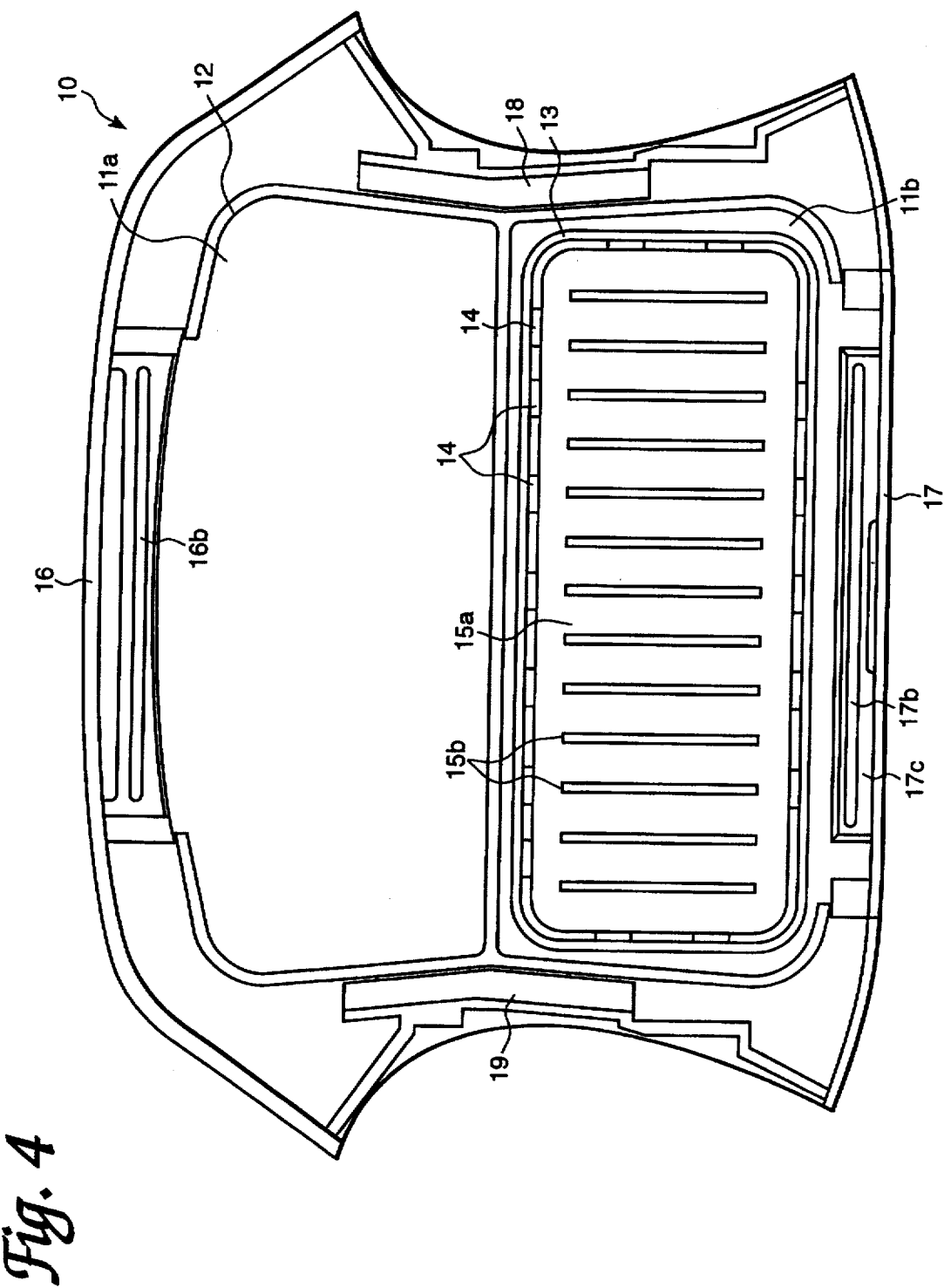
FIG. 4 is a bottom view showing a cover member to be used in the pad of FIG. 1.
Figure 5:
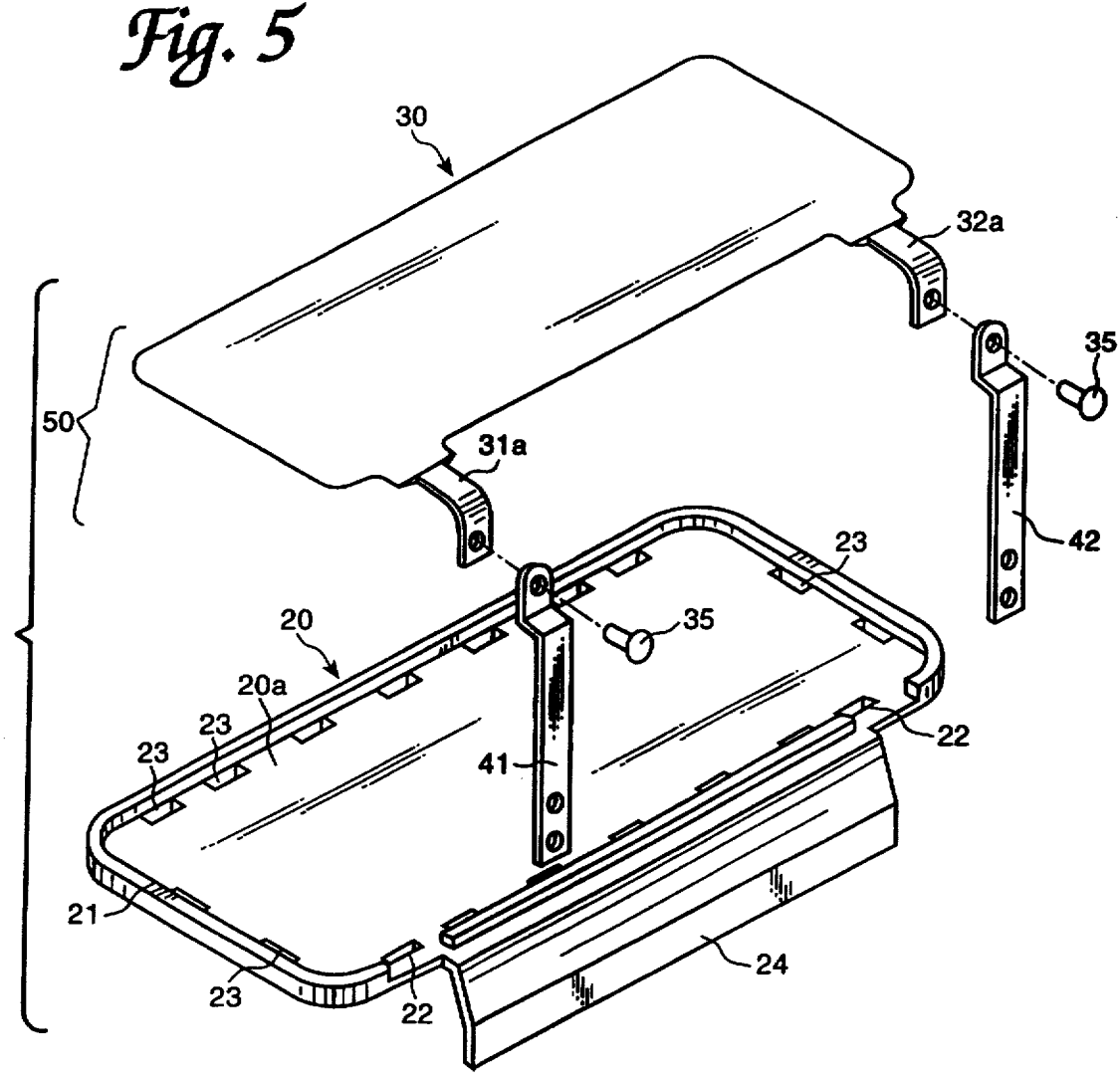
FIG. 5 is an exploded perspective view showing a support plate and a switch of the pad of FIG. 1.

As shown in FIG. 1, a pad 9 is arranged over the central boss B of a steering wheel W. The pad 9 covers an air bag 1 of an air bag device M, as shown in FIGS. 2 and 3.

The air bag device M is constructed to include the air bag 1, an inflator 2, the pad 9, a backup plate 3 and a holder plate 4.

The air bag 1 is accommodated in a folded shape in the air bag device M. The inflator 2 inflates the air bag 1 by supplying it with predetermined gases.

The backup plate 3 is composed of a bottom wall 3a and side walls 3d extending upward from the peripheral edges of the bottom wall 3a. The bottom wall 3a is formed into a rectangular shape and has an insertion hole 3b for inserting the inflator 2. The side walls 3d are formed at their leading ends with hooks 3e bent downwardly.

The holder plate 4 is composed of a bottom wall 4a and side walls 4d extending upwardly from the two longitudinal edges of the bottom wall 4a. The bottom wall 4a is formed into a rectangular shape and has an insertion hole 4b for inserting the inflator 2.

The plates 3 and 4 hold the air bag 1, the inflator 2 and the pad 9. The air bag 1 and the inflator 2 are held by the two plates 3 and 4 by making use of an annular retainer 5. The retainer 5 is equipped with a plurality of bolt portions 5a extending downwardly. The bolt portions 5a of the bolt 5 are inserted into the peripheral edge of an opening 1a below the air bag 1 through the through holes 3c of the backup plate 3, the through holes 4c of the holder plate 4 and the flange 2a of the inflator 2 until they are fastened by means of nuts 6. Thus, the air bag 1 and the inflator 2 are held by the two plates 3 and 4. Moreover, the pad 9 is also held by the two plates 3 and 4. Specifically, the hooks 3e of the side walls 3d of the plate 3 are fitted at first in the grooves 16a, 17a, 18a and 19a which are formed in the side walls 16, 17 18 and 19 of the pad 9 as shown in FIG. 3. Moreover, the side walls 4a of the plate 4 are inserted into the fitting grooves 16b and 17b which are formed at the end faces of the side walls 16 and 17. Thus, the pad 9 is held by the two plates 3 and 4.

The air bag device M is fixed on a portion of the core Wc of the steering wheel W. This fixing operation makes use of nuts or the like (not shown) which are anchored on the side walls 3d of the backup plate 3.

Moreover, the pad 9 is constructed to include a cover member 10 and a membrane switch forming member 50. The switch forming member is composed of a support plate 20 and a switch body 30 arranged on the upper face of the support plate 20.

The cover member 10 is made of a synthetic resin material such as a thermoplastic elastomer of polyester, as shown in FIGS. 1 to 4. Moreover, the cover member 10 is equipped with an upper wall 11 and four side walls 16, 17, 18 and 19 extending downwardly from the lower faces of the outer peripheral edges of the upper wall 11.

This upper wall 11 is formed with a rupture portion 12 which has a thin cross-sectional portion and is arranged generally in the shape of letter "H", as shown in FIG. 1. The rupture portion 12 is ruptured when the air bag 1 is inflated. At the time of rupturing, a front door portion 11a and a rear door portion 11b, which are defined by the rupture portion 12, are extended like a double-leafed hinged door. When the front door portion 11a and the rear door portion 11b are thus opened, the air bag 1 can be fully inflated, and moved beyond the upper wall 11.

The portion of the upper wall 11 forming the rear door portion 11b is formed on its back face with a gap regulating brim 13 which is raised in the shape of a square cylinder. Moreover, the gap regulating brim 13 is formed on its end face with a number of mounting ribs 14 which extend downwardly at a gap.

The inner portion of the gap regulating brim 13 provides an actuation portion 15 for actuating the switch body 30. The actuation portion 15 is equipped with a number of push ribs 15b. These push ribs 15b are transversely juxtaposed and longitudinally extended. The remaining portion 15a of the actuation portion 15, other than the push ribs 15b, is made thinner than the remaining portion of the upper wall 11. The remaining portion of the upper wall 11 is the portion of the upper wall 11 outside of the gap regulating projections 13, and other than the rupture portion 12.

The support plate 20 of the switch forming member 50 is formed into a square plate shape. Moreover, the support plate 20 is made of a rigid synthetic resin material that is harder than that of the cover member 10.

The support plate 20 is formed on its outer peripheral edge with gap regulating projections 21, as shown in FIGS. 1–3 and FIG. 5. The gap regulating projections 21 can come into abutment against the end faces of the gap regulating projections 13 of the cover member upper wall 11. On the other hand, the gap regulating projections 21 at the outer peripheral edge of the support plate 20 are formed therein with a plurality of mounting holes 23. The mounting holes 23 receives the mounting ribs 14 of the cover member upper wall 11. Moreover, the support plate 20 is formed at its rear edge with a tongue 24. The tongue 24 is formed to extend downwardly.

As shown in FIG. 3, the support plate 20 is formed with recesses 22 at its two portions having no gap regulating projections 21 on their upper faces. The recesses 22 provide portions for inserting there-through the latter-described terminals 31a and 32a of the switch body 30.

This switch body 30 energizes the horn. Further, the switch body 30 is constructed, as shown in FIGS. 1–3 and FIG. 5, to include an upper sheet 31, a lower sheet 32 and a number of insulating spacers 33. The upper sheet 31 is made of phosphor bronze or the like. The lower sheet 32 is made of stainless steel or the like. The insulating spacers 33 are made of a deformable insulating material and are arranged between the two sheets 31 and 32. These sheets 31 and 32 are made so thin that they have generally no rigidity. Terminals 31a and 32a are mounted on the individual back portions of the sheets 31 and 32.

Connection sheets 41 and 42 are fastened by rivets 35 to the terminals 31a and 32a. The connection sheets 41 and 42 are individually made of a conductive material and are connected with the positive and negative terminals of the horn energizing circuit of the vehicle.

Incidentally, the switch body 30 is covered with a protecting film (although its designation is omitted) except the terminals 31a and 32a thereof. Moreover, the switch body 30 is given a plane shape corresponding to the inner portion of the mounting holes 23 over the support plate 20, except the terminals 31a and 32a.

The spacers 33 are arrayed regularly at an equal gap between the two plates 31 and 32. The arrangement of the spacers 33 is set such that the push ribs 15b of the cover member upper wall 11 are arranged over the upper plate 31 between the spacers 33 when the switch body 30 is assembled in the cover member 10. In the illustrated embodiment, therefore, when activating the horn, the ribs 15b push on plate 31 at all times no matter what area of the pad 9 within the contour of the switch body 30 might be pushed. As a result, an even load can be retained during operation of the switch.

The assembly of the pad 9 is described below. First of all, the connection sheets 41 and 42 are respectively riveted by rivets 35 to the terminals 31a and 32a of the switch body 30. Moreover, the switch body 30 is placed on the upper face 20a which is surrounded by the mounting holes 23 of the support plate 20.

Next, the mounting ribs 14 of the cover member upper wall 11 are inserted into the individual mounting holes 23 of the support plate 20 and the gap regulating projections 21 of the support plate 20 are brought simultaneously into abutment against the end faces of the gap regulating projections 13 of the cover member upper wall 11. At this time, the lower end of the tongue 24 of the support plate 20 comes into abutment against the upper face of a stepped portion 17c of the side wall 17 of the cover member 10.

Next, the lower ends of the individual mounting ribs 14 protruding from the mounting holes 23 are thermally melted to acquire a diameter larger than the internal diameter of the mounting holes 23. As a result, the individual mounting ribs 14 retain the peripheral edges of the mounting holes 23 so that the support plate 20 and the switch body 30 can be assembled with respect to the cover member 10, thus completing the assembly of the pad 9.

Next, the hooks 3e of the side walls are individually retained in the grooves 16a, 17a, 18a and 19a of the side walls 16, 17, 18 and 19. Moreover, the side walls 4a are individually inserted into the fitting grooves 16b and 17b of the side walls 16 and 17. Then, the pad 9 is held by the backup plate 3 and the holder plate 4.

Incidentally, the air bag 1 is folded in advance. Moreover, the air bag 1 and the inflator 2 are temporarily assembled by making use of the retainer 5. Then, the air bag device M can be assembled as a whole when the pad 9 is assembled with the plates 3 and 4.

Next, the air bag device M is fixed on the portion of the steering wheel core Wc by making use of nuts or the like (not shown) of the backup plate 3. Moreover, the connection sheets 41 and 42 are connected with the predetermined portions. Then, the assembly of the steering wheel W can be completed and mounted on the vehicle.

In the pad of the invention, the actuation portion 15 of the cover member upper wall 11 is pushed to energize the horn. Then, the remaining thin portion 15a of the actuation portion 15 is deformed to lower the push ribs 15b so that the upper sheet 31 comes into contact with the lower sheet 32. As a result, the switch body 30 is turned ON or energized to operate the horn.

In the pad 9, a predetermined gap is established by the gap regulating projections 13 and 21 between the back face of the cover member upper wall 11 and the upper face 10a of the rigid support plate 20 inside of the outer peripheral edge. As a result, the switch body 30 arranged over the support plate 20 can ensure a predetermined operation stroke while not being influenced by the bias of the folded air bag 1.

In the illustrated embodiment, the gap between the upper face 20a of the support plate 20 inside of the mounting holes 23 and the lower ends of the push ribs 15b of the cover member upper wall 11 could be uniformly retained to such a value for each pad 9 as is greater by about 0.5 mm than the thickness of the switch body 30.

When the air bag 1 is inflated, the cover member 10 is ruptured at its rupture portion 12. Moreover, the air bag 1 is extended as if its front door portion 11a and rear door portion 11b were a double-leafed hinged door. After this, the air bag 1 is fully expanded out of the upper wall 11.

Since the support plate 20 is made of a synthetic resin, the switch forming member 50 can have its weight reduced more than that of the switch forming member of the prior art which uses a thick metal sheet. As a result, the opening rate of the rear door portion 11b of the cover member 10 will not drop while the air bag 1 is being extended.

In the illustrated embodiment, moreover, the gap regulating projections 13 and 21 for establishing the predetermined gap between the support plate upper face 20a and the back face of the cover member upper wall 11 are formed on both the support plate 20 and the cover member upper wall 11. However, the gap regulating projections may be formed on either the support plate upper face 20a and the cover member upper wall 11.

Figure 6:
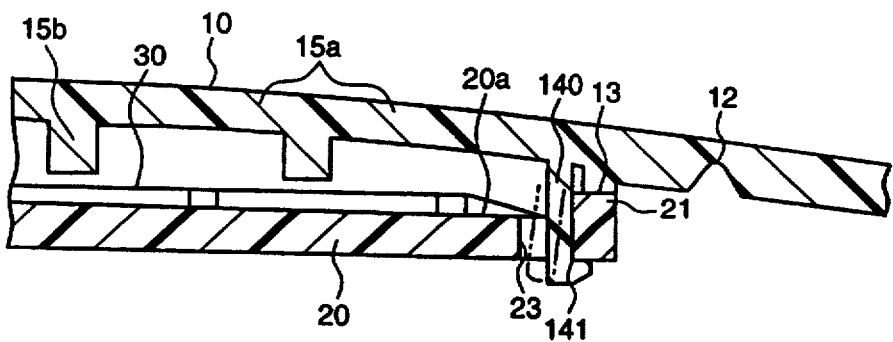
FIG. 6 is a sectional view of another mounting rib.

Further, in the illustrated embodiment, there is disclosed the structure in which the support plate 20 is attached to the cover member upper wall 11 by thermally melting the lower ends of the mounting ribs 14 to enlarge the internal diameter of the mounting holes 23. However, it is possible to use mounting ribs 140 which are equipped with retaining projections 141, as shown in FIG. 6. These ribs 140 are deformed horizontally or constricted so that they can be easily inserted into the mounting holes 23 of the support plate 20. After these insertions, the ribs 140 can be restored to retain the peripheral edges of the mounting holes 23 with their retaining projections 141.

In the illustrated embodiment, the switch body 30 is exemplified for operating the horn. However, the switch body 30 can naturally be applied to a switch for other operations. Moreover, the structure of the switch body 30 should not be limited to the two-layer type having the upper sheet 31 and the lower sheet 32, as in the illustrated embodiment, but can be exemplified by a three-layer type if it has a membrane shape.

Furthermore, as shown in FIG. 7, a support plate 120 constituting the switch forming member 50 may be formed with a plurality of reduced cross-section portions 121. The portions 121 are provided so as to not deteriorate the rigidity of the support plate 120 extremely. The portions 121 are formed by through holes or recesses. The switch forming member 50 can have its weight reduced further by the support plate 120 which is formed with portions 121.

While the invention has been described in connection with what is presently considered to be the most practical and preferred embodiment, it is to be understood that the invention is not limited to the described embodiment, but, on the contrary, it is intended to cover various modifications and equivalent arrangements included within the spirit and scope of the appended claims.

What is claimed is:

1. A cover member of an air bag device comprising:
   (a) a main body including a rupture portion to be ruptured when an air bag is inflated;
   (b) at least one door portion defined by the rupture portion and positioned at the inside thereof, wherein said at least one door portion is made of a thermoplastic elastomer and is formed in a single layer;
   (c) a gap regulating brim positioned within the door portion and extending along the rupture portion and being thicker than a remaining portion of the door portion;
   (d) an actuating portion positioned at an inner portion defined by the gap regulating brim and being thinner than the remaining portion;
   (e) switching means arranged within the actuating portion; and
   (f) a support plate positioned on a back face of the switching means and fixed to the door portion.

2. A cover member of an air bag device according to claim 1, wherein the actuating portion is provided with projections.

3. A cover member of an air bag device according to claim 2, wherein the projections of the actuating member are ribs formed in a vertical direction.

4. A cover member of an air bag device according to claim 1, wherein the support plate is fixed in the vicinity of the gap regulating brim.

5. A cover member of an air bag device comprising:
   (a) a main body including a rupture portion to be ruptured when an air bag is inflated;
   (b) a plurality of door portions defined by the rupture portion and positioned at the inside thereof;
   (c) a gap regulating brim positioned within one of said plurality of door portions and extending along the rupture portion and being thicker than a remaining portion of said one door portion;
   (d) an actuating portion positioned at an inner portion defined by the gap regulating brim and being thinner than the remaining portion, wherein said door portion, said gap regulating brim and said actuating portion are formed as a whole;
   (e) switching means arranged within the actuating portion on said one door portion, wherein each door portion without said switching means is thinner than the gap regulating brim and thicker than the actuating portion; and
   (f) a support plate positioned on a back face of the switching means and fixed to the door portion.

* * * * *